United States Patent [19]

Chang

[11] Patent Number: 5,687,360
[45] Date of Patent: Nov. 11, 1997

US005687360A

[54] BRANCH PREDICTOR USING MULTIPLE PREDICTION HEURISTICS AND A HEURISTIC IDENTIFIER IN THE BRANCH INSTRUCTION

[75] Inventor: Po-Hua Chang, Santa Clara, Calif.

[73] Assignee: Intel Corporation, Santa Clara, Calif.

[21] Appl. No.: 431,016

[22] Filed: Apr. 28, 1995

[51] Int. Cl.$^6$ .................................................. G06F 9/40
[52] U.S. Cl. .......................................................... 395/587
[58] Field of Search ................................ 395/800, 775, 395/587

[56] References Cited

U.S. PATENT DOCUMENTS

| | | | |
|---|---|---|---|
| 5,093,778 | 3/1992 | Favor et al. | 395/375 |
| 5,394,529 | 2/1995 | Brown et al. | 395/375 |
| 5,553,253 | 9/1996 | Pan et al. | 395/375 |
| 5,564,118 | 10/1996 | Steely et al. | 395/375 |

OTHER PUBLICATIONS

"Correlation–Based Branch Prediction", Pan, S.T., So, K.; Rahmeh, J.T., Conference Title: Conference Record of The Twenty–Sixth Asilomar Conference on Signals, Systems and Computers (Cat. No. 92CH3245–B) pp. 51–55, vol. 1. Publisher: IEEE Computer Soc. Press, Los Alamitos, CA USA. Publ. Date: 1992, USA. Conference Date: Oct. 26–28, 1992., Pacific Grove, CA.

Tse–Yu Yeh and Yale N. Patt, "A Comparison of Dynamic Branch Predictors that Use Two Levels of Branch History"; The 20th Annual Interntional Symposium on Computer Architecture; San Diego, California; 1993; pp. 257–266.

Johnny K.F. Lee and Alan Jay Smith, "Branch Prediction Strategies and Branch Target Buffer Design", *Computer;* vol. 17, No. 1; Jan. 1984; pp. 6–22.

James E. Smith; "A Study of Branch Prediction Strategies"; The 8th Annual Symposium on Computer Architecture; Minneapolis, MN; 1981; pp. 135–148.

Tse–Yu Yeh and Yale N. Patt; "Alternative Implementations of Two–Level Adaptive Branch Prediction"; 19th Annual International Symposium on Computer Architecture; Australia; 1992; pp. 124–134.

Chang, et al.; "Branch Classification: a New Mechanism for Improving Branch predictor Performance"; Department of Electrical Engineering and Computer Science; Univ. of Michigan; 1991; (10 pages total).

Shien–Tai Pan, et al.; "Improving the Accuracy of Dynamic Branch Prediction Using Branch Correlation"; 1992; pp. 76–84.

*Primary Examiner*—David Y. Eng
*Attorney, Agent, or Firm*—Blakely, Sokoloff, Taylor & Zafman

[57] ABSTRACT

In a computer program, a branch instruction selects a prediction heuristic from a plurality of prediction heuristics for predicting whether the branch will be taken during execution of the program by a computer. A current pattern comprises a number of consecutive identical branch decisions for the instruction. A prior pattern comprises a number of consecutive identical prior branch decisions for the instruction, the prior branch decisions occurring prior to the branch decisions comprised by the current pattern. The selected prediction heuristic generates a branch prediction using the current pattern and the prior pattern. The selected prediction heuristic is identified by adding profiling instructions to the program to compute history information for the branch instruction. The profiling instructions input the branch history information to a plurality of prediction heuristics, and each prediction heuristic outputs a prediction of whether the branch instruction will be taken. The program is executed with a sample data set, and the output of each prediction heuristic is compared to the branch decision for the instruction to identify which heuristic most accurately predicts the branch decision for the branch instruction.

54 Claims, 7 Drawing Sheets

BRANCH PREDICTOR USING MULTIPLE PREDICTION HEURISTICS AND A HEURISTIC IDENTIFIER IN THE BRANCH INSTRUCTION

BACKGROUND

1. Field of the Invention

The invention relates to methods and circuits for branch prediction in microprocessors. More specifically, the invention relates to predicting whether a branch will be Taken using multiple local and global prediction heuristics.

2. Art Background

Pipelining is a proven method for enhancing the performance of the central processing unit (CPU) in a digital computer. In a pipelined CPU, multiple functional units simultaneously execute multiple instructions from a computer program, leading to substantial performance increases.

A pipelined CPU operates most efficiently when the instructions are executed in the sequence in which they appear in memory. Unfortunately, branch instructions constitute a large portion of the executed instructions in a computer program. When a branch instruction is executed, execution continues either with the next sequential instruction, or jumps to an instruction at a specified "target" address. The branch specified by the instruction is said to be "Taken" if execution jumps, or "Not Taken" if execution continues with the next sequential instruction in memory.

A branch instruction is either unconditional, meaning the branch is taken every time the instruction is executed, or conditional, meaning the branch is taken or not depending upon a condition. The instructions to execute following a conditional branch are not known with certainty until the condition upon which the branch depends is resolved. Prefetching and executing the instructions at the target address of the branch can lead to a significant performance hit when the branch is Not Taken. Branches may also be "forward", meaning the target address is greater than the instruction pointer (IP), or "backward", meaning the target address is less than the instruction pointer.

To compensate for the execution uncertainty caused by conditional branches, advanced pipelined CPUs employ "branch prediction". Branch prediction predicts the outcome of each conditional branch instruction in the program before the instruction is executed. If the branch is predicted as Taken, the processor fetches and executes instructions beginning at the target address of the branch. If the branch is predicted Not Taken, execution continues at the next instruction after the branch instruction.

When a branch prediction is incorrect, any fetched and partially executed instructions resulting from the incorrect prediction must be flushed from the pipeline. Even a prediction miss rate of 5 percent results in a substantial loss in performance due to the number of instructions incorrectly fetched/partially executed in reliance on the wrong predictions. Further delays are incurred while the processor fetches the correct instructions to execute following the branch.

As the instruction issue rate and pipeline depth of processors increases, the accuracy of branch prediction becomes an increasingly significant factor in performance. Many schemes have been developed for improving the accuracy of branch predictions. These schemes may be classified broadly as either static or dynamic. Static schemes use branch opcode information and profiling statistics from executions of the program to make predictions. Static prediction schemes may be as simple as predicting that all branches are Not Taken or predicting that all branches are Taken. Predicting that all branches are Taken can achieve approximately 68 percent prediction accuracy as reported by Lee and Smith (J. Lee and A. J. Smith, "Branch Prediction Strategies and Branch Target Buffer Design", IEEE Computer, (January 1984), pp.6–22). Another static scheme predicts that certain types of branches (for example, jump-on-zero instructions) will always be Taken or Not Taken. Static schemes may also be based upon the direction of the branch, as in "if the branch is backward, predict Taken, if forward, predict Not Taken". This latter scheme is effective for loop intensive code, but does not work well for programs where the branch behavior is irregular.

One method of static prediction involves storing a "branch bias" bit with each branch instruction. When the instruction is decoded, the "branch bias" bit is used to predict whether the branch is Taken or not. The bias bit is usually determined statistically by profiling the program with sample data sets, prior to execution. A profiling method is used to generate the branch bias bit. First the program is loaded into the computer memory. Starting with the first instruction in the program, a branch instruction is located. Instructions are added to the program to record branch decisions for the instruction. The program is then executed with a number of sample data sets. Execution is stopped, and beginning with the first instruction in the program each branch instruction is located. The profiling instructions are removed from the program, and if the probability that the branch will be Taken exceeds 50%, then the branch bias bit is set in the branch instruction and saved with the program. When the program is next executed, the bias bit is examined. If set, the branch is always predicted as Taken during execution of the program. Otherwise, the branch is always predicted as Not Taken.

A disadvantage of all static prediction schemes is that they ignore branch behavior in the currently executing program. By contrast, dynamic prediction schemes examine the current execution history of one or more branch instructions when making predictions. Dynamic prediction can be as simple as recording the last execution of a branch instruction and predicting the branch will behave the same way the next time. More sophisticated dynamic predictors examine the execution history of a plurality of branch instructions. Dynamic prediction typically requires more hardware than static prediction because of the additional run-time computation required.

In dynamic prediction, branch history information is applied to an heuristic algorithm. The heuristic algorithm inputs the branch execution history and outputs an indication of whether the branch will be Taken or Not Taken the next time it is executed. An example of a heuristic algorithm is one which counts the number of Taken and Not Taken decisions in the last M branch decisions. If the number of Taken decisions equals or exceeds the number of Not-Taken decisions, the branch is predicted as Taken.

Dynamic prediction schemes may be further classified into local and global prediction schemes. Local prediction schemes depend entirely on the "self-history" of the branch-to predict. Specifically, local prediction schemes depend exclusively on the execution history of the branch under consideration, completely ignoring the execution history of other branches in the program. Local prediction schemes work well for scientific/engineering applications where program execution is dominated by inner-loops. However, in programs where control-flows are complex, the outcome of a branch is often affected by the outcomes of other, recently executed branches. Because of this correlation, the local history of a branch, considered alone, is not an accurate indicator of future branch behavior. Studies have shown that branch correlation is traceable to high-level language constructs (S. T. Pan, K. So, J. T. Rahmeh, "Improving the Accuracy of Dynamic Branch Prediction Using Branch Correlation", Proceedings of the 5th International Conference on Architectural Support for Programming Languages and Operating Systems, Oct. 1992).

One method of local branch prediction uses a history table to record history information for a branch instruction. N bits of the instruction address are used to index an entry in the history table, where N is typically less than the number of bits in the branch instruction address. Because N is less than the number of bits in the branch instruction address, the history table serves as a hash table for all possible branch instructions in a program. Each entry of the history table stores the address of the branch for which the information in the entry is current. Storing the branch address in the entry makes it possible to detect hash-collisions when the address of a branch instruction does not match the address of the instruction for which the history information in an entry is current.

Each entry of the history table also contains an L bit branch sequence for a branch instruction, where L is a number of prior branch decisions to record for the branch. The L-bit branch sequence records whether the last L executions of the branch instruction resulted in the branch being Taken or Not-Taken. For example, if L=2 and the last two executions of the branch resulted in a Taken and a Not-Taken decisions, then the branch sequence is 10, where logical one (1) represents the Taken decision and logical zero (0) represents the Not-Taken decision. Each entry in the table also contains an array of $2^L$ saturating up-down counters. For L=2, each entry also contains four saturating up-down counters, one counter for each of the four possible branch sequences. The possible sequences are: <Not-Taken, Not-Taken>, <Not-Taken, Taken>, <Taken-Not-Taken>, and <Taken, Taken>. In binary, these sequences are 00, 01, 10, and 11. Each counter counts the number of times a particular branch sequence results in a Taken decision when the branch is next executed. For example, counter 0 records the number of times the sequence 00 results in a branch decision of Taken when the branch instruction is next executed.

To predict whether a branch will be Taken or Not Taken upon the next execution of the branch instruction, the count associated with the branch sequence for the instruction is examined by the prediction heuristic logic. A typical heuristic works as follows: if the count is greater than or equal to a predetermined threshold value, the branch is predicted Taken, otherwise the branch is predicted Not Taken. If the count has P bits of resolution, a typical threshold value is $2^{P-1}$, which is the midpoint of the range of a P-bit counter. Once the branch is executed, resulting in a branch decision, the branch decision is input to the history update logic. If the branch is Taken, the count for the branch sequence is incremented by one. Otherwise the count is decremented by one. If the count reaches $2^P-1$ (i.e. the counter is saturated), the count remains at that value as long as the branch is Taken on subsequent executions for the same history sequence. If the count reaches 0, it remains at zero as long as the branch is Not Taken on subsequent executions for the same history sequence. Once the count is updated, the branch sequence is updated with the result of the branch decision. The high-order bit is shifted out of the branch sequence, and the result of the branch decision is shifted in. If the branch is Taken, a 1 is shifted in, otherwise a 0 is shifted in Because each branch instruction has its own array of counters, no correlation occurs between the information used to predict separate branches. The scheme is relatively expensive in terms of hardware required because every branch instruction with an entry in the table requires a history sequence and a table of counters. This scheme is also less accurate for branches with execution behaviors highly correlated to the behavior of other branches.

A similar counter-based prediction scheme uses global branch history instead of a local branch history. The history of all recently executed branches in the program is recorded in a single N-bit shift register. As each branch in the program is Taken or not, the high-order bit is shifted out of the register, and the branch decision is shifted in. The contents of the register represent the global branch history of the program after several branch instructions are executed in the program. The contents of register is used to address a particular entry in the global branch history table. Each entry of the table contains a saturating up-down counter. The selected counter counts recurrences of the global history sequence currently recorded in the register. A prediction is made by a prediction heuristic which inputs the count, in a manner identical to that described for the local predictor. The count for the global sequence in the register is also updated in a manner similar to the manner described for the local predictor.

Global prediction schemes are more accurate for branches with execution behaviors correlated to the behavior of other branches. Furthermore, global prediction schemes typically require less hardware than purely local schemes because only one shift register is required, and only one count per entry in the global history table is required.

In either the local or global branch predictors just described, one simple heuristic for predicting the next branch is "if the current input history pattern results in a Taken decision for the next branch instruction more than half the time, predict Taken". For example, if a particular execution pattern repeated six times, and four or more of those times the next branch decision was Taken, then the heuristic would predict Taken. Otherwise the heuristic would predict Not Taken.

A purely local predictor requires recording the history sequence for each branch instruction separately (subject to hashing). A purely local predictor also requires an array of counters for each branch instruction. A purely global predictor uses a single shift register to record the branch history of the last M branch instructions in the program. Hybrids of the local and global predictors may be employed, reflecting both local and global branch characteristics. One hybrid predictor uses multiple shift registers. The history of multiple branch instructions from a set of branch instructions in the program is recorded in each register. This hybrid scheme reflects correlation's between branches in a set, without entirely obscuring the local behavior of branches in the set. Prediction is done independently for each set of instructions, using the N-bit counter scheme discussed earlier. A separate table of counters is maintained for each set of instructions. A branch instruction is assigned to a set according to L bits of the branch instruction address. For example, if the branch instructions in a program are divided into eight sets, then three bits of the branch instruction address are used to select a set, and the histories of all branch instructions with the same L bits in their address are superimposed into one history register. The same L bits of the instruction address are used to select the count a branch history table corresponding to the set to which the branch belongs. The count is input to a prediction heuristic, and a prediction is made. The branch instruction is then executed, resulting in a branch decision. The L bits of the instruction address are used to select which branch history register is updated by the branch decision.

Dynamic prediction schemes may involve single or multiple heuristics. The prediction schemes described above are single-heuristic schemes. Conventional multi-heuristic schemes input history of a branch instruction to multiple heuristics, then select the "best" prediction for the branch from among the heuristic outputs. One method of selecting the "best" prediction is to elect the majority decision of the multiple heuristics. For example, the branch history information may be input to three heuristics. If a majority of the three heuristics elect the branch Taken, then it is predicted Taken by majority circuit. Otherwise the branch is predicted Not Taken. Multi-heuristic approaches are generally more accurate than single-heuristic approaches, but typically require more hardware to implement and are thus more expensive.

SUMMARY OF THE INVENTION

The present invention is a method and apparatus for improving the accuracy of branch predictions during the execution of a computer program. Prior art methods work well for predicting most branch instructions in a computer program, but a few branches in the program defy accurate prediction using the prior art methods. The present invention improves the prediction accuracy of all branches, by using the branch instruction to select a prediction heuristic which works best for the instruction. When the program is executed, a current pattern is generated comprising a number of consecutive identical branch decisions for the branch instruction. A prior pattern is generated comprising a number of consecutive identical prior branch decisions for the instruction, where the prior decisions occur prior to the branch decisions comprised by the current pattern. The current pattern and the prior pattern are input to the prediction heuristic selected by the branch instruction, and the output of this heuristic becomes the prediction of whether the branch will be Taken.

The prediction heuristic selected by a branch instruction is determined by adding profiling instructions to the program to compute history information for the branch instruction. The profiling instructions input the branch history information to a plurality of prediction heuristics. Each prediction heuristic outputs a prediction of whether the branch instruction will be Taken. The program is executed with a sample data set, and the output of each prediction heuristic is compared to the branch decision for the instruction to identify which heuristic most accurately predicts the branch decision for the branch instruction.

DETAILED DESCRIPTION

The present invention improves branch prediction by identifying the best prediction heuristic from a plurality of heuristics to use for each branch instruction in a computer program. In the preferred embodiment, the best heuristic for a branch instruction is identified before normal execution of the program, although alternate embodiments are possible in which the best heuristic is identified during the initial phases of normal execution. Branch history information is input to the identified heuristic to predict whether the branch will be taken. In one embodiment, the branch history comprises a current pattern, a prior pattern, and a pattern count. A field in the branch instruction identifies the prediction heuristic to use for the instruction, and the output of the identified heuristic becomes the prediction of whether the branch will be Taken. The present invention improves the accuracy of branch prediction for all branches in a computer program, and in particular improves the accuracy of a few branches which defy conventional prediction schemes.

In the present invention, branch history information is kept in the form of patterns. A pattern identifies one or more consecutive identical branch decisions for the instruction. For example, assume that a branch instruction is executed four times. On each of the first three executions the branch is Not-Taken, and then it is Taken on the fourth execution. The pattern 0001 is formed, where a binary zero (0) represents a Not-Taken decision for the branch, and a binary one (1) represents a Taken decision. Alternatively, the same sequence of branch decisions could produce the pattern 1110, where a binary one (1) represents a Not-Taken decision, and a binary zero (0) represents a Taken decision. In both cases, the pattern can be represented by the number three (3), which is the number of consecutive identical branch decisions which created the pattern. Alternatively, the pattern can be represented by the number four (4), which is the total number of bits in the pattern. The invention is not limited to a particular encoding method for the pattern. Other encoding methods are possible, with the above examples intended to merely illustrate the possible encodings. Examples in this disclosure identify a taken decision with a binary one (1) and a not-taken decision with a binary zero (0).

Figure 1:
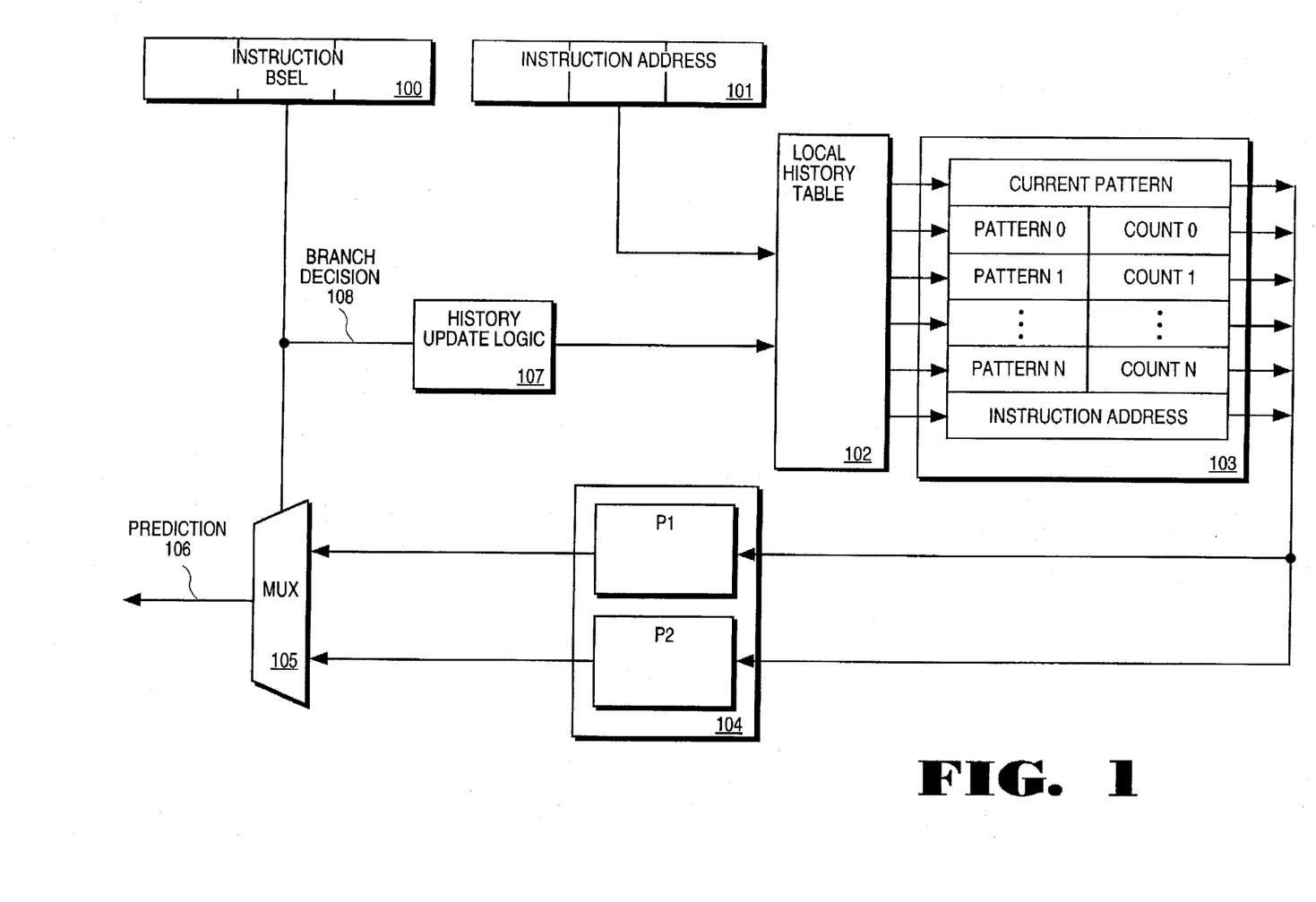
FIG. 1 is a block diagram illustration of one embodiment of the system of the invention, that provides a prediction scheme containing multiple heuristics and a branch instruction identifying the heuristic to use.

FIG. 1 shows one embodiment of the present invention. In this embodiment, several bits of the branch instruction address 101 are used to index into a branch history table 102. Each entry 103 in the branch history table contains the current pattern for a particular branch instruction, an array of one or more prior patterns, and an array of pattern counts, each pattern count corresponding to a prior pattern. The current pattern identifies a number of most recent consecutive identical branch decisions for the branch instruction. Prior patterns identify sequences of identical consecutive branch decisions which occurred prior to the current pattern. A count is kept of the number of occurrences of each prior pattern.

For example, consider a branch with the history sequence 01000101000. According to this sequence, after eleven executions the branch was Taken three times and Not-Taken eight times. The current pattern is 000, which is encoded as the number three (3), representing the last three consecutive Not-Taken decisions for the branch. The prior patterns are, from left to right in the sequence, 01, 0001, and 01. The prior pattern 01 occurs twice and the prior pattern 0001 occurs once in the sequence. The prior patterns can be encoded as <2,2>, <4,1>, <2,2>. The sequence 01 is encoded as the number two (2), and it occurs two times, resulting in two pattern/count pairs of <2,2>. The sequence 0001 is encoded as the number four (4), and it occurs once, resulting in a single pattern/count pair of <4,1>. Scanning the branch history sequence from right to left, it is readily apparent that in this embodiment the prior patterns are ordered according to their position in the branch history sequence.

Each entry 103 in the local history table also includes the branch instruction address (a copy of branch instruction address 101) for which pattern information is currently maintained. Because only a subset of the bits from the branch instruction address 101 are used to address an entry 103 in the table, each entry 103 in the table can map to more than one branch instruction address 101 in the program. It is thus necessary to maintain a copy of the branch instruction address 101 for which the pattern information is current, so that the entry 103 can be re-initialized when a second branch instruction address 101 maps to the entry 103 previously used by a first branch instruction address 101. When the branch instruction address 101 stored in the local history table 102 does not match the branch instruction address 101 used to index the entry 103, then a hash collision occurs. The entry 103 is re-initialized and a new copy of the branch instruction address 101 is recorded in the entry 103.

The current pattern, prior patterns, and counts are input to a plurality of prediction heuristics 104. In one embodiment, the outputs of all predictions heuristics are input to a multiplexer 105. The field BSEL within the branch instruction 100 selects an output from the plurality of prediction heuristic outputs which becomes the prediction 106. Alternately, the current pattern, prior patterns, and counts may be input to only the prediction heuristic identified by the BSEL field in the branch instruction 101, using the multiplexer 105 at the input of the plurality of prediction heuristics 104. The branch instruction is subsequently executed, resulting in a branch decision 108. The branch decision is input to history update logic 107, which updates the current pattern, prior patterns, and counts according to the branch decision. In one embodiment, the current pattern is updated first. In the present example, the current pattern for the branch is updated from 000 to 0001. This pattern is checked against the prior patterns. The pattern 0001 appeared once before, and so the count for this pattern is updated from one(1) to two(2). The new pattern/count pair becomes <4,2>. The current pattern is reset to zero(0), because the sequence of three Not-Taken decisions is interrupted by the most recent Taken decision.

A few of the many types of heuristics that may be utilized are described below. It is contemplated that many types of heuristics other than the ones described here may be utilized. One possible heuristic is a Most-Likely-Pattern-Next (MLPN) heuristic. This heuristic predicts the next branch decision based upon the most frequently occurring prior pattern for the instruction. Therefor, if the current pattern is 0, and the prior patterns are <2,2> and <4,1>, the MLPN predictor predicts a next pattern of 01, because this prior pattern occurs most frequently for the instruction (twice). Because the pattern 01 is generated by predicting the next branch Taken, the MLPN predictor predicts the next branch Taken in the present example. When implemented in a pipelined computer processor, the Taken prediction results in the prefetch and processing of the program instructions at the target address of the branch instruction.

Another heuristic is the Least-Likely-Pattern-Next (LLPN) heuristic. This heuristic predicts the next branch decision based on the least frequently occurring prior branch pattern. Therefor, if the current pattern is 000, and the prior patterns are <2,2> and <4,1>, the LLPN predictor predicts a next pattern of 0001, because the prior pattern 0001 occurs least frequently for this instruction. Because the pattern 0001 is generated by predicting the branch Taken, the MLPN predictor predicts the branch Taken in the present example. When implemented in a pipelined computer processor, the Taken prediction results in the prefetch and processing of the program instructions at the target address of the branch instruction.

Another heuristic is the most recent pattern next (MRPN) heuristic. This heuristic predicts the next branch decision based on the most recently occurring prior branch pattern. Therefor, if the current pattern is 0, and the prior patterns are <2,2> and <4,1>, the MRPN predictor predicts a next pattern of 01, because the prior pattern 01 occurs most recently for this instruction (only the current pattern is more recent). This heuristic requires that the array of prior patterns and counts are ordered according to their position in the branch history sequence. Because the pattern 01 is generated by predicting the branch Taken, the MRPN predictor predicts the branch Taken in the present example. When implemented in a pipelined computer processor, the Taken prediction results in the prefetch and processing of the program instructions at the target address of the branch instruction.

Another heuristic is the delta plus last pattern next (DPLP) heuristic. This heuristic predicts the next branch decision based upon the difference between the two most recently occurring prior branch patterns. The difference is added to the second-most recently occurring prior pattern to compute the next predicted pattern. Therefor, if the current pattern is 0, and the prior patterns are <2,2>, <4,1>, and <2,2>, the DPLP predictor predicts a next pattern of 000001, i.e. six (6). This next pattern is predicted as follows: (1) compute the difference between the second prior pattern and the first, which yields 4−2=2; and (2) add this difference to the second prior pattern, which yields 4+2=6. The pattern six (6) will not occur if the branch is predicted Taken, and therefor the branch is predicted Not-Taken in the present example. The DPLP heuristic requires that the array of prior patterns and counts are ordered according to their position in the branch history sequence. When implemented in a pipelined computer processor, the Taken prediction results in the prefetch and processing of the program instructions at the target address of the branch instruction.

Figure 2:
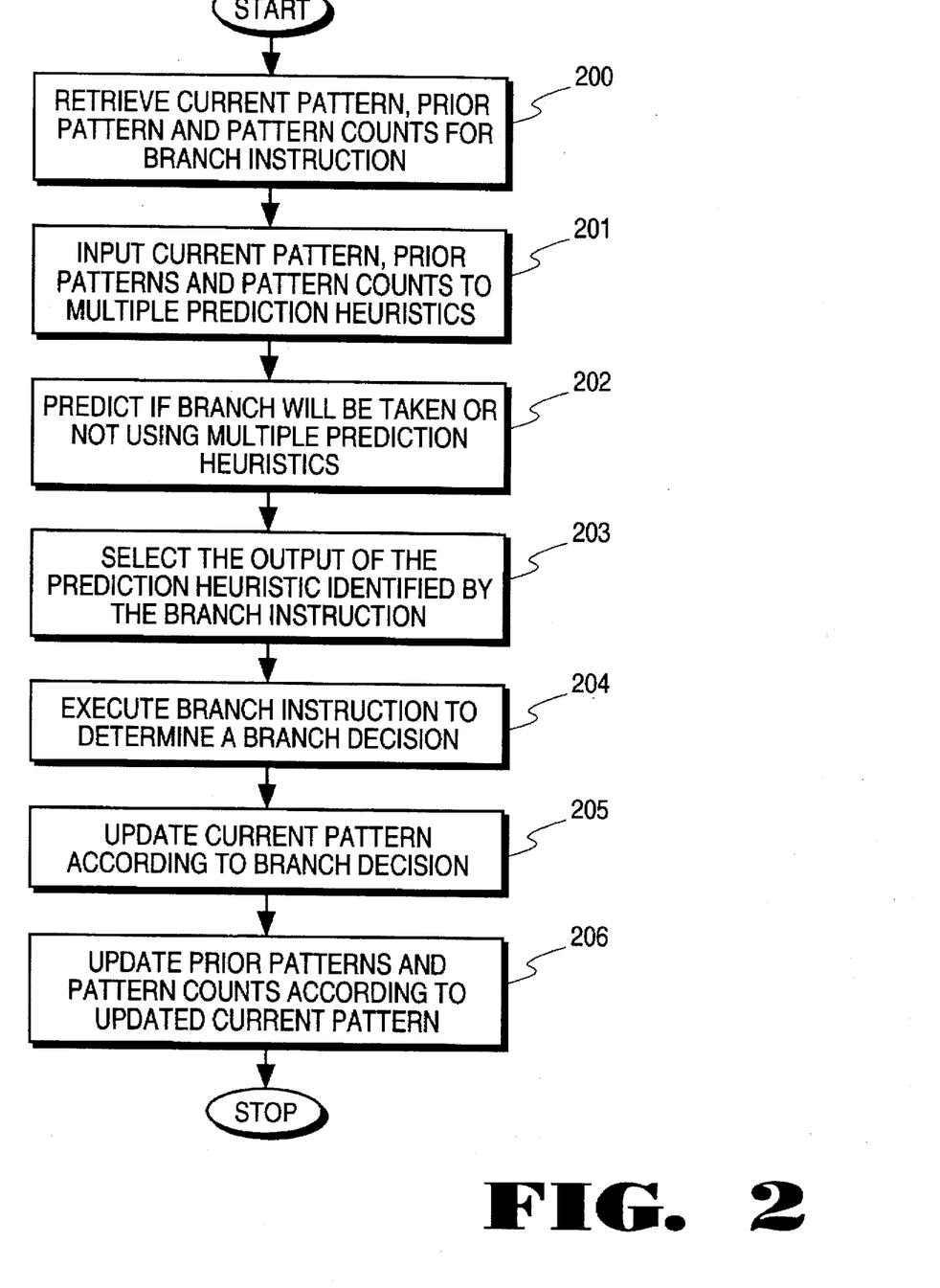
FIG. 2 is a flow chart illustrating one embodiment of a method for predicting whether a branch will be Taken.

FIG. 2 describes the steps for predicting whether a branch will be Taken using the embodiment illustrated by FIG. 1. First, the current pattern, prior patterns, and pattern counts for the branch instruction are retrieved from memory 200. This information is input to multiple prediction heuristics 201. Each prediction heuristic predicts whether the branch will be Taken or Not Taken 202. The output of the prediction heuristic identified by the BSEL field of the branch instruction is selected 203. The branch instruction is subsequently executed to determine a branch decision 204. The current pattern is updated according to the branch decision 205, and the updated current pattern is used to update the prior patterns and counts 206.

Figure 3:
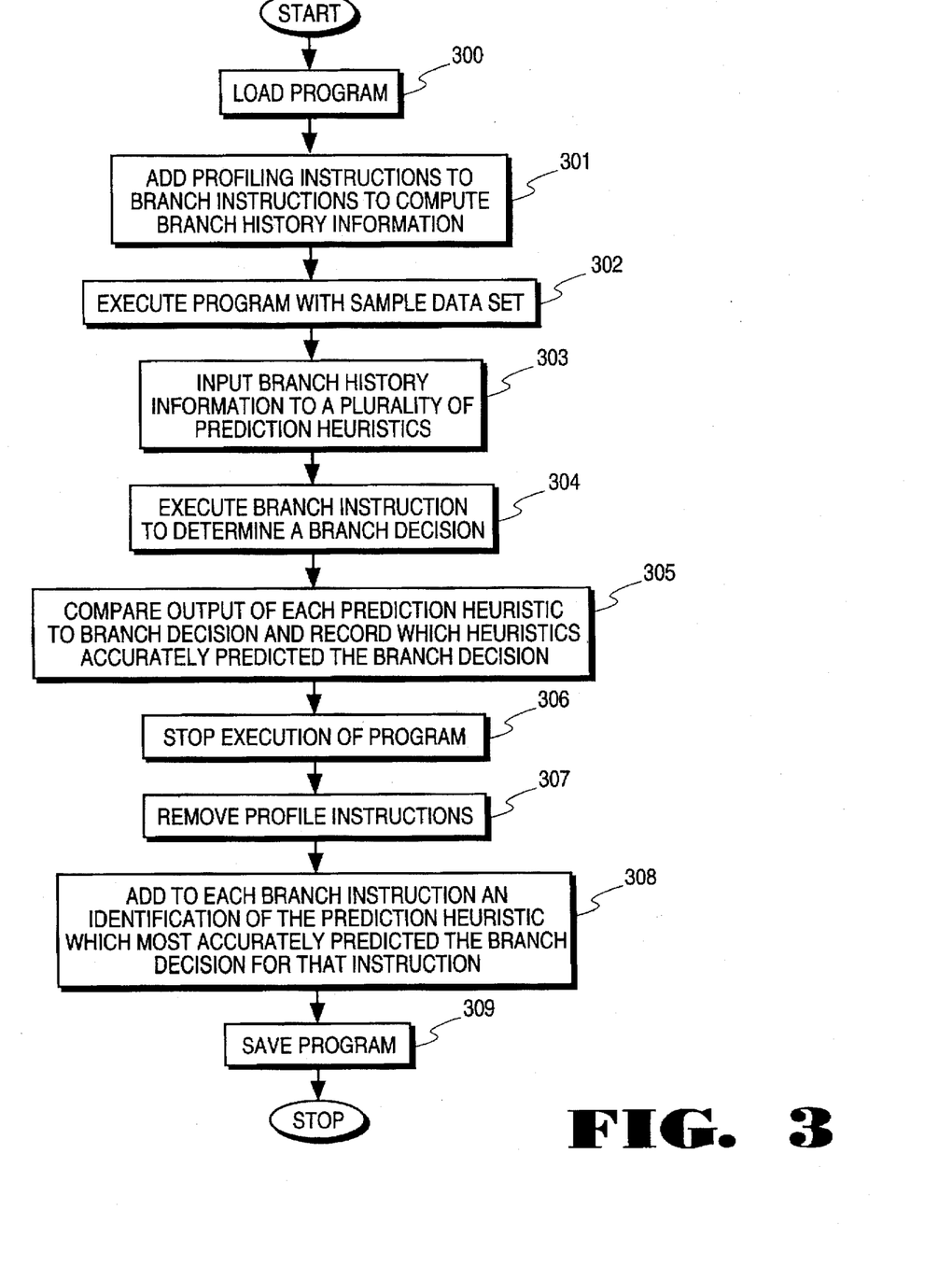
FIG. 3 is a block diagram illustration of one embodiment of a method of identifying the heuristic to use for a branch instruction.

In one embodiment, the prediction heuristic identified in a branch instructions field is determined using the method shown in FIG. 3. First, the computer program containing the branch instructions is loaded from permanent memory into RAM 300. Profiling instructions are added to the program at or near the location of each branch instruction to compute the current pattern, the prior patterns and the pattern counts for the branch instruction 301. The program is subsequently executed with a sample data set 302. Thus, when a branch instruction is encountered during program execution, the profile instructions are executed prior to execution of the branch instruction. The resulting current pattern, prior patterns, and pattern counts are input to a plurality of prediction heuristics 303, and the branch instruction is executed 304 to determine a branch decision. The output of each prediction heuristic is compared to the branch decision and the results of the comparison are recorded 305.

Execution is stopped 306, and the profiling instructions are removed 307 for all branch instructions. The BSEL field of each branch instruction is then set to identify the prediction heuristic which most accurately predicted the branch decision for that instruction 308. Finally, the program is saved from RAM to permanent storage 309.

One skilled in the art will appreciate that many variations of the method described in FIG. 3 are possible, without departing from the spirit of the invention. For example, the insertion of the profiling instructions in step 301 may be accomplished prior to loading the computer program into memory, for example by a compiler which compiles the program from a high-level language into machine language. Also, the removal of the profiling instructions and setting of the BSEL field in the branch instruction to identify the prediction heuristic which most accurately predicts the branch (steps 307–308) may be performed subsequently to saving the program from RAM to permanent storage 309, for example using a compiler. In an alternative embodiment, the steps described in FIG. 3 may be accomplished during normal execution of the program for a number of initial iterations of the program code. This alternate embodiment has the advantage that no separate execution of the program is required to identify the prediction heuristics of the branch instructions encountered during execution. A disadvantage is that execution efficiency of the program may be adversely affected during the initial iterations of the program code while profiling is carried out.

In one embodiment, the plurality of local predictors is supplemented by one or more global predictors. Global branch history information is recorded and input to the global predictor. The global history information can include a global history sequence and a table of counts, each count indicating the number of times the corresponding global sequence has occurred. Additional profiling instructions may be used to further compute the global history information and input this information to a global predictor. The output of the global predictor is compared with the outputs of the local predictors. If the global predictor more accurately predicts whether the branch instruction will be Taken, then the BSEL field of the branch instruction is set to identify the global predictor, otherwise BSEL is set to identify the local predictor which most accurately predicts the branch instruction.

Figure 4:
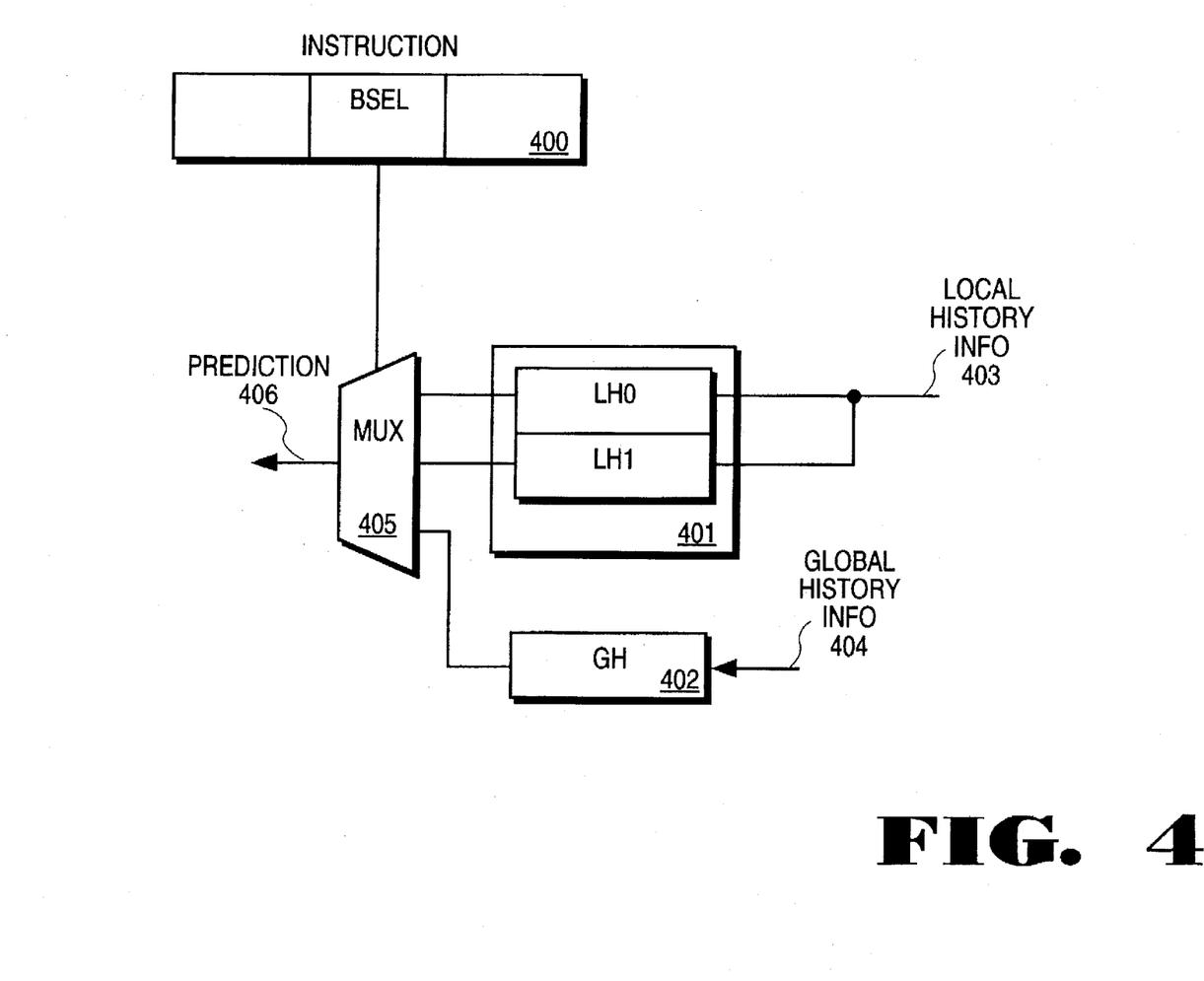
FIG. 4 is a block diagram illustration of one embodiment of a system which combines local and global heuristics.

FIG. 4 shows one embodiment in which the outputs of the local predictors 401 are input to a multiplexer 405 and, in addition, the output of a global predictor 402 is input to a multiplexer 405. The BSEL field of the instruction 400 selects the output of either a local predictor 401 or the global predictor 402, depending on which predictor is identified by BSEL. In this embodiment, local history information 403 is input to the local predictors 401. The local history information can include the output of local history tables. Global history information 404 in input to the global predictor 402. The global information can include the output of global history tables.

Figure 5:
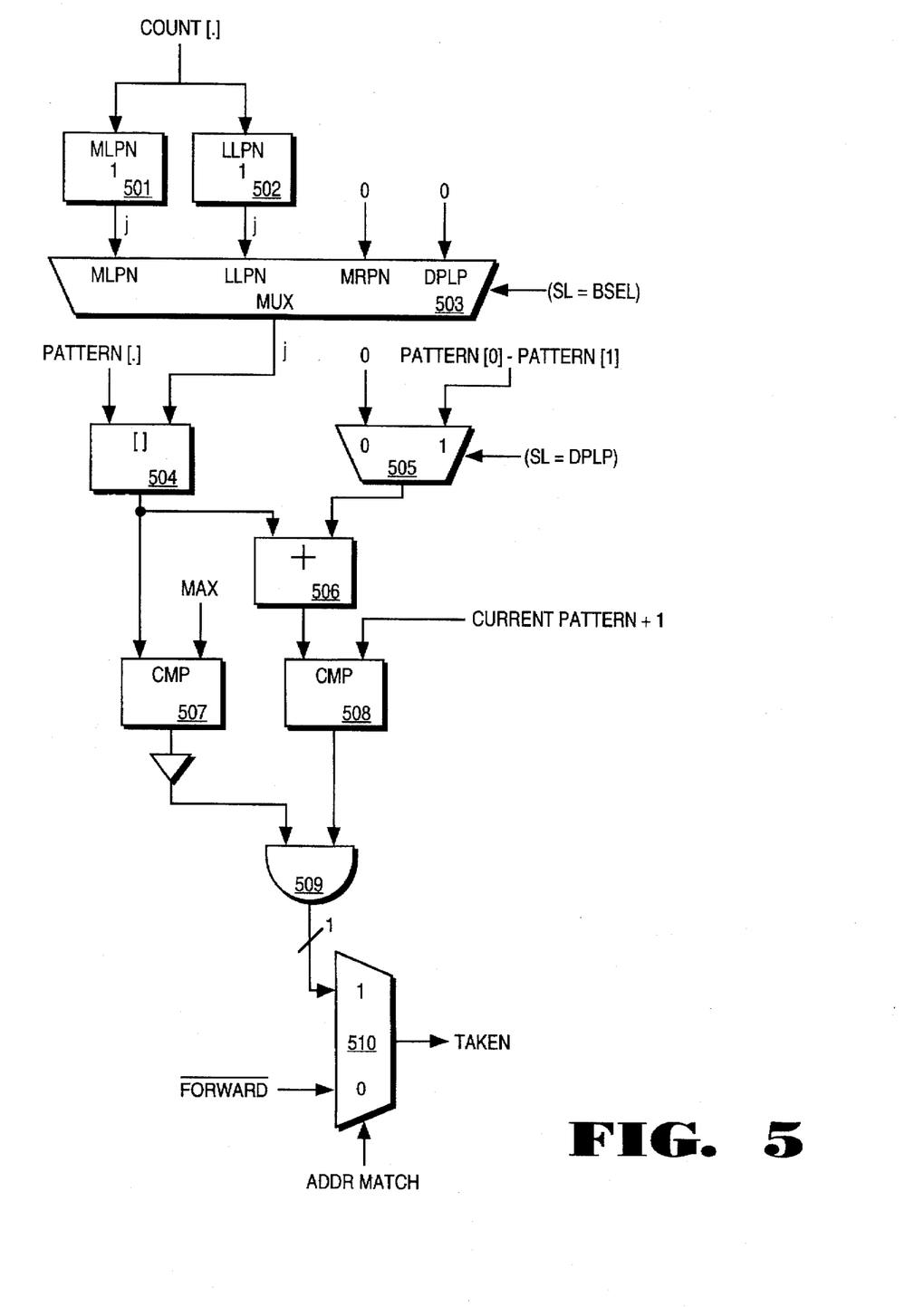
FIG. 5 illustrates exemplary circuitry for predicting whether a branch will be taken using multiple local heuristics.

FIG. 5 shows one embodiment of a circuit that implements multiple local prediction heuristics. It is apparent to one skilled in the art that the present invention is not limited to this embodiment and that different circuitry and logic may be used. Referring to FIG. 5, the array of pattern counts for a branch is input to the MLPN 501 and the LLPN 502 prediction heuristics, each of which outputs an index of the prior pattern to use in the prediction. The MRPN and DPLP algorithms always output zero as the index of the prior pattern to use in the prediction, because these heuristics always use the most recent prior pattern when making the prediction. The most recent pattern has an index of zero when the patterns are ordered according to which pattern occurred most recently. The indices are input to a multiplexer 503 and a selection is made based upon the BSEL field in the instruction. The pattern index and the array of prior patterns are input to an element selector 504, which outputs the prior pattern with the given index. This pattern is compared to the maximum pattern length allowed, using comparator 507. Because the pattern is represented by a saturating counter, the pattern will equal a maximum value (the saturation value of the counter) when the maximum pattern length is met or exceeded. The output of comparator 507 is inverted, so that when the selected pattern does not meet or exceed the maximum length allowed for a pattern, the output is asserted. The asserted output comprises one input to AND gate 509.

The prior pattern with the selected index is also input to adder 506. Using selector 505, the difference between prior pattern 0 and prior pattern 1 is also input to adder 506 if the selected heuristic is DPLP. Otherwise a value of 0 is input to adder 506. Thus if the selected heuristic is DPLP, the difference between prior pattern 0 and prior pattern 1 is added to the prior pattern 0 (the selected prior pattern for the DPLP heuristic). For all other heuristics, 0 is added to the prior pattern. The output of adder 506 is the predicted next pattern. The predicted pattern is compared with the next current pattern which would result from a Taken decision. If there is a match, then comparator 508 output is asserted. This asserted input is input to AND gate 509. If both the output of comparator 508 and the (inverted) output of comparator 507 are asserted, then AND gate 509 output is asserted. If the address of the branch instruction matches the address in the look-up table entry used to compute the branch decision, then multiplexer 510 selects Taken as the next branch prediction. Otherwise, by default, Not Taken is predicted for forward branches, and Taken is predicted for backward branches.

Figure 6:
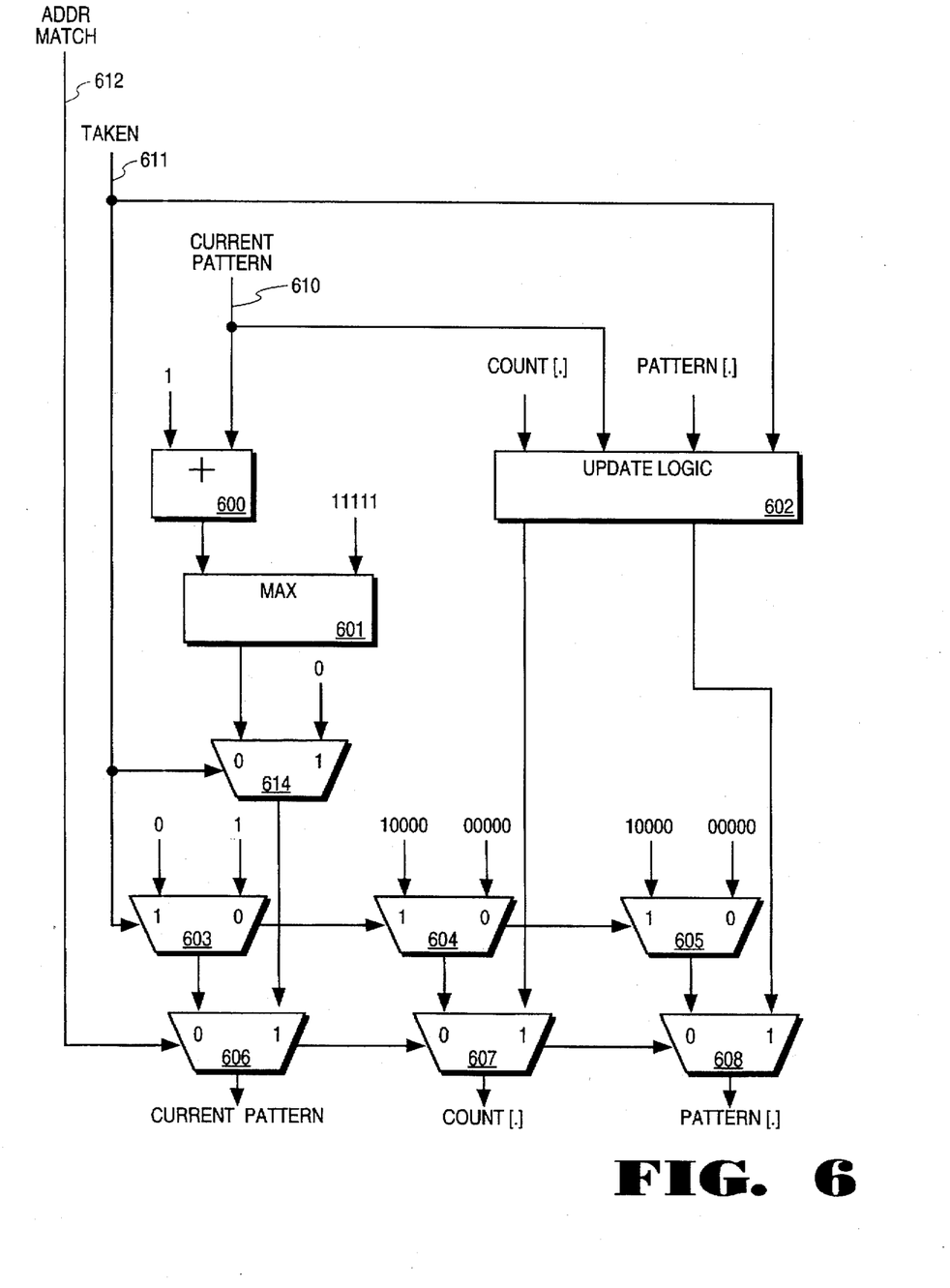
FIG. 6 illustrates one example of circuitry for updating branch history information.

FIG. 6 shows one embodiment of a circuit to update the local branch history. The current pattern 610 is incremented using adder 600 and the result is input to maximizer circuit 601. The second input of maximizer 601 is the maximum allowable pattern, in this example binary 11111. The maximizer 601 outputs the maximum of the incremented current pattern and the maximum value allowed, binary 11111. Using multiplexer 614 the updated current pattern is input to multiplexer 606 if the branch was Not Taken, or reset to 0 otherwise. Multiplexer 606 and multiplexer 603 are used to reset the current pattern when there is an indication 612 that the branch address does not match the address of the branch in the history table. When the addresses do not match, a hash-collision has occurred and all history information for the branch must be reset. The branch decision 614 selects either a logical one (1) (if the branch was Not Taken) or a logical zero (0) (if the branch was Taken) as the reset value of the current pattern. Multiplexer 604 and 605 select reset values for the arrays of counts and prior patterns. When a hash collision occurs, multiplexers 607 and 608 select the reset values for the counts and prior patterns (input 0 of the multiplexers). Otherwise, multiplexers 607 and 608 select the updated counts and patterns from update logic 602 (input 1 of the multiplexers).

Figure 7:
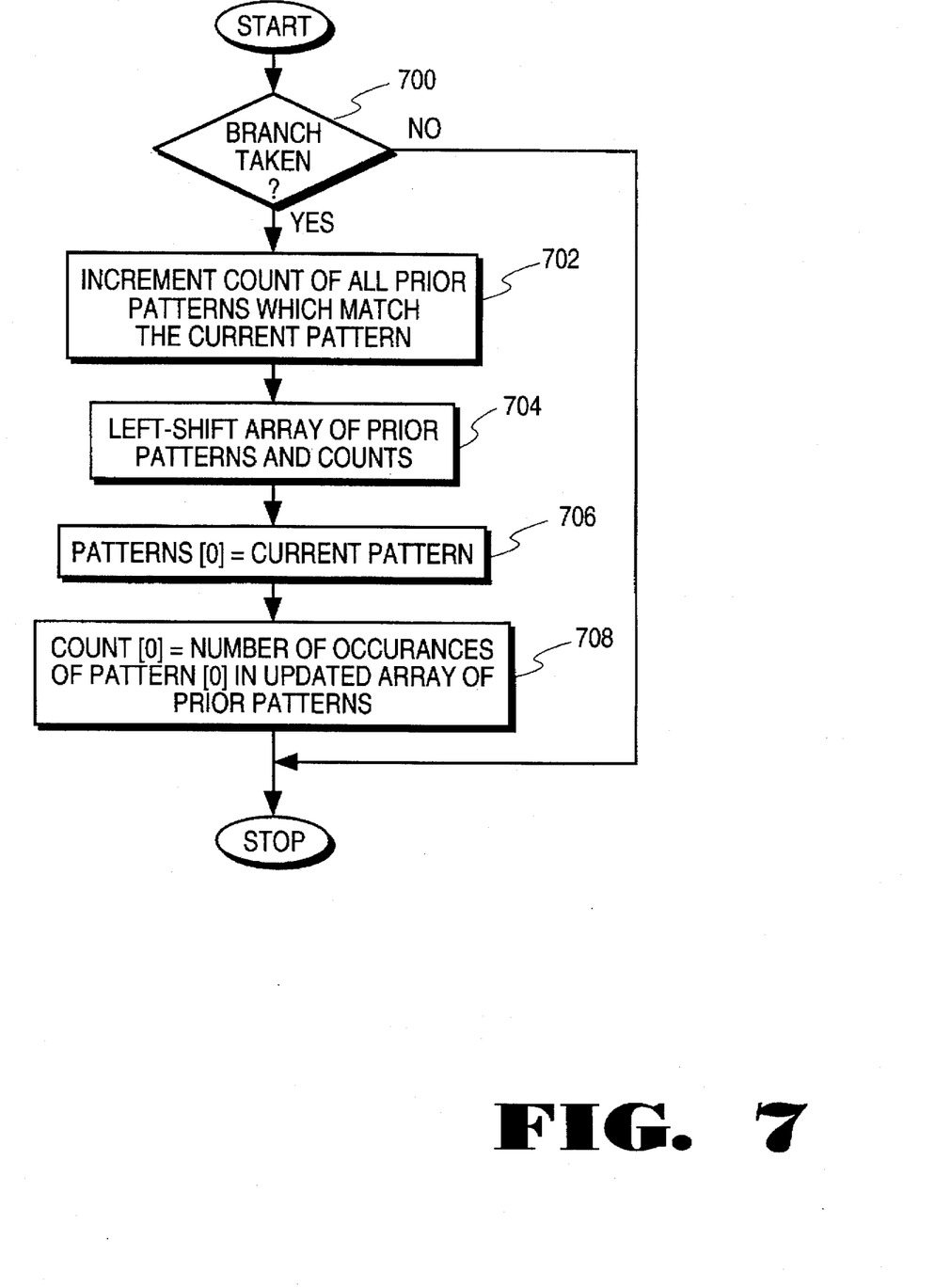
FIG. 7 is a flow diagram illustrating one embodiment of a method of updating the prior patterns and counts for a branch instruction.

FIG. 7 shows one embodiment of the update logic for updating the prior patterns and counts. If the branch is taken 700, then the counts of all prior patterns which match the current pattern are incremented 702. The array of prior patterns and counts is left-shifted 704, so that the least-recent pattern and count are shifted out of the array. The most recent prior pattern is then set to the current pattern 706. The count of the most recent pattern is set to the number of occurrences of the most recent pattern in the array of prior patterns 708.

It is readily apparent from FIGS. 5 and 6 that using the present invention, a plurality of predictions heuristics may be implemented with low hardware costs. Hardware costs are reduced using the present invention because many of the hardware components for computing the prediction and updating the history information are shared among the plurality of prediction heuristics.

The specific arrangements and methods described herein are merely illustrative of the principles of the invention. Numerous modifications in form and detail may be made by those of ordinary skill in the art without departing from the scope of the present invention. For example, the invention described herein is not limited to any particular coding method for the history pattern information, nor is it limited to the specific heuristics described herein.

Although this invention has been shown in relation to a particular embodiment, it should not be considered so limited. Rather, the invention is limited only by the scope of the appended claims.

We claim:

1. A method of predicting whether a branch specified by an instruction in a computer program will be taken during execution of the program by a computer, the method comprising the steps of:

providing the instruction from the program, the instruction comprising the branch specified, the instruction configured to cause selection of a prediction heuristic from a plurality of distinct prediction heuristics;

storing in a memory a current pattern comprising a number of consecutive identical branch decisions for the instruction;

storing in the memory a prior pattern comprising a number of consecutive identical prior branch decisions for the instruction, the prior branch decisions occurring prior to the branch decisions comprised by the current pattern;

generating a prediction of whether the branch will be taken using the selected prediction heuristic, the selected prediction heuristic using the current pattern and the prior pattern to generate the prediction.

2. The method of claim 1 further comprising the steps of:
executing the instruction to determine a branch decision; and
updating the current pattern and the prior pattern according to the branch decision.

3. The method of claim 1 further comprising the steps of storing in the memory a pattern count, the pattern count comprising a count of occurrences of the prior pattern, the selected prediction heuristic using the pattern count to generate the prediction.

4. The method of claim 3 further comprising the steps of:
executing the instruction to determine a branch decision; and
updating the pattern count according to the branch decision.

5. The method of claim 1 further comprising the steps of:
storing in the memory a global sequence, the global sequence comprising a number of branch decisions for a plurality of instructions;
storing in the memory a global count, the global count comprising a count of occurrences of the global sequence; and
said step of generating including generating a prediction of whether the branch will be taken using a global prediction heuristic, the global heuristic using the global count to generate the prediction.

6. The method of claim 5 further comprising the steps of:
executing the instruction to determine a branch decision; and
updating the current pattern, the prior pattern, the global sequence, and the global count according to the branch decision.

7. The method of claim 1 further comprising the steps of inputting the current pattern and the prior pattern to each prediction heuristic of the plurality of prediction heuristics, the output of the selected prediction heuristic being the prediction of whether the branch will be taken.

8. The method of claim 1 further comprising the steps of inputting the current pattern and the prior pattern to only the selected prediction heuristic, the output of the selected prediction heuristic being the prediction of whether the branch will be taken.

9. The method of claim 1 in which the plurality of prediction heuristics comprises a most-likely-pattern-next (MLPN) prediction heuristic.

10. The method of claim 1 in which the plurality of prediction heuristics comprises a least-likely-pattern-next (LLPN) prediction heuristic.

11. The method of claim 1 in which the plurality of prediction heuristics comprises a most-recent-pattern-next (MRPN) prediction heuristic.

12. The method of claim 1 in which the plurality of prediction heuristics comprises a delta-plus-last-pattern (DPLP) prediction heuristic.

13. The method of claim 1 in which the prediction heuristic selected by the branch instruction is determined by a method comprising the steps of:

locating the branch instruction in a program and adding profiling instructions for the branch instruction to the program, the profiling instructions, when executed, computing history information for the branch instruction and inputting the history information to a plurality of prediction heuristics, each prediction heuristic outputting a prediction of whether the branch instruction will be taken;

executing the program with a sample data set, the, execution of the program causing execution of the profiling instructions, the execution of the program further causing execution of the branch instruction, the execution of the branch instruction comprising a branch decision; and comparing the output of each prediction heuristic from the plurality of prediction heuristics to the branch decision to identify a prediction heuristic from the plurality of prediction heuristics which most accurately predicts the branch decision for the branch instruction.

14. A method of determining a prediction heuristic for a branch instruction in a computer program, the method comprising the steps of:

locating the branch instruction in the program and adding profiling instructions for the branch instruction to the program, the profiling instructions, when executed, computing history information for the branch instruction and inputting the history information to a plurality of prediction heuristics, each prediction heuristic outputting a prediction of whether the branch instruction will be taken;

executing the program with a sample data set, the execution of the program causing execution of the profiling instructions, the execution of the program further causing execution of the branch instruction, the execution of the branch instruction comprising a branch decision; and comparing the output of each prediction heuristic from the plurality of prediction heuristics to the branch decision to identify a prediction heuristic from the plurality of prediction heuristics which most accurately predicts the branch decision for the branch instruction.

15. The method of claim 14 further comprising the steps of:

removing the profiling instructions from the program; and adding to the instruction an identification of the prediction heuristic which most accurately predicts the branch decision for the branch instruction.

16. The method of claim 14 in which the plurality of prediction heuristics comprises a most-likely-pattern-next (MLPN) prediction heuristic.

17. The method of claim 14 in which the plurality of prediction heuristics comprises a least-likely-pattern-next (LLPN) prediction heuristic.

18. The method of claim 14 in which the plurality of prediction heuristics comprises a most-recent-pattern-next (MRPN) prediction heuristic.

19. The method of claim 14 in which the plurality of prediction heuristics comprises a delta-plus-last-pattern (DPLP) prediction heuristic.

20. An apparatus for predicting whether a branch specified by an instruction in a computer program will be taken during execution of the program by a computer, the instruction configured to cause selection of a prediction heuristic from a plurality of distinct heuristics to predict whether the branch specified by the instruction will be taken, the apparatus comprising:

a first storage device that stores a current pattern comprising a number of consecutive identical branch decisions for the instruction, said storage device also storing a prior pattern comprising a number of consecutive identical prior branch decisions for the instruction, the prior branch decisions occurring prior to the branch decisions comprised by the current pattern;

a circuit that includes a plurality of prediction heuristics comprising the selected prediction heuristic;

and a circuit configured to use the selected prediction heuristic using the current pattern and the prior pattern to generate a prediction of whether the branch will be taken.

21. The apparatus of claim 20 further comprising a pattern count, the pattern count comprising a count of occurrences of the prior pattern, the selected prediction heuristic using the pattern count to generate a prediction of whether the branch will be taken.

22. The apparatus of claim 21 in which the computer comprises an execution unit, the execution unit to execute the instruction and to output a branch decision indicating whether the branch specified by the instruction was taken, the apparatus further comprising an update unit to update the pattern count according to the branch decision.

23. The apparatus of claim 20 in which the computer comprises an execution unit, the execution unit to execute the instruction and to output a branch decision indicating whether the branch specified by the instruction was taken, the apparatus further comprising an update unit to update the current pattern and the prior pattern according to the branch decision.

24. The apparatus of claim 20 further comprising:

a second storage device that stores a global sequence, the global sequence comprising a number of branch decisions for a plurality of instructions, said second storage device also storing a global count, the global count comprising a count of occurrences of the global sequence; and a circuit including a global prediction heuristic using the global sequence and the global count wherein said circuit configured to use the plurality of prediction heuristics to generate a prediction of whether the branch will be taken.

25. The apparatus of claim 24 in which the computer comprises an execution unit, the execution unit to execute the instruction and to output a branch decision indicating whether the branch specified by the instruction was taken, the apparatus further comprising an update unit to update the global sequence, the global count, the current pattern, and the prior pattern according to the branch decision.

26. The apparatus of claim 20 in which the current pattern and the prior pattern are input to each prediction heuristic of the plurality of prediction heuristics, the output of the selected prediction heuristic being the prediction of whether the branch will be taken.

27. The apparatus of claim 20 in which the current pattern and the prior pattern are input to only the selected prediction heuristic, the output of the selected prediction heuristic being the prediction of whether the branch will be taken.

28. The apparatus of claim 20 in which the plurality of prediction heuristics comprise logic to implement a most-likely-pattern-next (MLPN) prediction heuristic.

29. The apparatus of claim 20 in which the plurality of prediction heuristics comprise logic to implement a least-likely-pattern-next (LLPN) prediction heuristic.

30. The apparatus of claim 20 in which the plurality of prediction heuristics comprise logic to implement a most-recent-pattern-next (MRPN) prediction heuristic.

31. The apparatus of claim 20 in which the plurality of prediction heuristics comprise logic to implement a delta-plus-last-pattern (DPLP) prediction heuristic.

32. The apparatus of claim 20 in which the prediction heuristic selected by the branch instruction is determined by an apparatus comprising:

a profiler to locate the branch instruction in a program, the profiler to add profiling instructions for the branch instruction to the program, the profiling instructions, when executed, to compute history information for the branch instruction and to input the history information to a plurality of prediction heuristics, each prediction heuristic to output a prediction of whether the branch instruction will be taken;

an execution unit to execute the program with a sample data set, the execution of the program causing execution of the profiling instructions, the execution of the program further causing execution of the branch instruction, the execution of the branch instruction comprising a branch decision; and a comparator to compare the output of each prediction heuristic from the plurality of prediction heuristics to the branch decision, the comparator to identify a prediction heuristic from the plurality of prediction heuristics which most accurately predicts the branch decision for the branch instruction.

33. An apparatus to determine a prediction heuristic for a branch instruction in a computer program, the apparatus comprising:

a profiler to locate the branch instruction in the program, the profiler adding profiling instructions for the branch instruction to the program, the profiling instructions, when executed, to compute history information for the branch instruction and to input the history information to a plurality of prediction heuristics, each prediction heuristic to output a prediction of whether the branch instruction will be taken;

an execution unit to execute the program with a sample data set, the execution of the program causing execution of the profiling instructions, the execution of the program further causing execution of the branch instruction, the execution of the branch instruction comprising a branch decision; and a comparator to compare the output of each prediction heuristic from the plurality of prediction heuristics to the branch decision, the comparator to identify a prediction heuristic from the plurality of prediction heuristics which most accurately predicts the branch decision for the branch instruction.

34. The apparatus of claim 33 further comprising an optimizer to remove the profiling instructions from the program, the optimizer further to add to the branch instruction an identification of the prediction heuristic which most accurately predicts the branch decision for the branch instruction.

35. A system for predicting whether a branch specified by an instruction in a computer program will be taken during execution of the program by a computer, the instruction configured to cause selection of a prediction heuristic from a plurality of distinct heuristics to predict whether the branch specified by the instruction will be taken, the system comprising:

a first storage device that stores a current pattern comprising a number of consecutive identical branch decisions for the instruction, said first storage device also storing a prior pattern comprising a number of consecutive identical prior branch decisions for the instruction, the prior branch decisions occurring prior to the branch decisions comprised by the current pattern;

a circuit including a plurality of prediction heuristics comprising the selected prediction heuristic;

a circuit configured to use the plurality of prediction heuristics, that use the current pattern and the prior pattern to generate a prediction of whether the branch will be taken; and an execution unit to execute the instruction, the execution unit to output a branch decision indicating whether the branch specified by the instruction was taken.

36. The system of claim 35 further comprising a pattern count, the pattern count comprising a count of occurrences of the prior pattern, the selected prediction heuristic using the pattern count to generate a prediction of whether the branch will be taken.

37. The system of claim 35 further comprising an update unit to update the pattern count according to the branch decision.

38. The system of claim 35 further comprising:

a second storage device that stores a global sequence, the global sequence comprising a number of branch decisions for a plurality of instructions, said second storage device also a global count, the global count comprising a count of occurrences of the global sequence; and a circuit including a global prediction heuristic using the global sequence and the global count to generate a prediction of whether the branch will be taken.

39. The system of claim 38 further comprising an update unit to update the global sequence, the global count, the current pattern, and the prior pattern according to the branch decision.

40. An apparatus for predicting whether a branch specified by an instruction in a computer program will be taken during execution of the program by a computer, the instruction configured to cause selection from a plurality of distinct prediction means, of a prediction means for predicting whether the branch specified by the instruction will be taken, the apparatus comprising:

means for storing a current pattern comprising a number of consecutive identical branch decisions for the instruction, the means for storing further storing a prior pattern comprising a number of consecutive identical prior branch decisions for the instruction, the prior branch decisions occurring prior to the branch decisions comprised by the current pattern; and a circuit including a plurality of prediction means comprising the selected prediction means, the circuit configured to use the plurality of prediction means that use the current pattern and the prior pattern for generating a prediction of whether the branch will be taken.

41. The apparatus of claim 40 the means for storing further storing a pattern count, the pattern count comprising a count of occurrences of the prior pattern, the selected prediction means using the pattern count to generate a prediction of whether the branch will be taken.

42. The apparatus of claim 41 in which the computer comprises an execution means, the execution means for executing the instruction and outputting a branch decision indicating whether the branch specified by the instruction was taken, the apparatus further comprising update means for updating the pattern count according to the branch decision.

43. The apparatus of claim 40 in which the computer comprises an execution means, the execution means for executing the instruction and outputting a branch decision indicating whether the branch specified by the instruction was taken, the apparatus further comprising update means for updating the current pattern and the prior pattern according to the branch decision.

44. The apparatus of claim 40 wherein the means for storing further storing a global sequence, the global sequence comprising a number of branch decisions for a plurality of instructions, the means for storing further storing a global count, the global count comprising a count of occurrences of the global sequence, the apparatus further comprising circuit means including global prediction means using the global sequence and the global count for generating a prediction of whether the branch will be taken.

45. The apparatus of claim 44 in which the computer comprises an execution means, the execution means for executing the instruction and for outputting a branch decision indicating whether the branch specified by the instruction was taken, the apparatus further comprising update means for s updating the global sequence, the global count, the current pattern, and the prior pattern according to the branch decision.

46. The apparatus of claim 40 in which the current pattern and the prior pattern are input to each prediction means of the plurality of prediction means, the output of the selected prediction means being the prediction of whether the branch will be taken.

47. The apparatus of claim 40 in which the current pattern and the prior pattern are input to only the selected prediction means, the output of the selected prediction means being the prediction of whether the branch will be taken.

48. An apparatus to determine the prediction heuristic identified by a branch instruction in a computer program, the apparatus comprising:

means for locating the branch instruction and adding profiling instructions for the branch instruction to the program, the profiling instructions, when executed, for computing history information for the branch instruction and for inputting the history information to a plurality of prediction means, each prediction means for outputting a prediction of whether the branch instruction will be taken;

means for executing the program with a sample data set, the execution of the program causing execution of the profiling instructions, the execution of the program further causing execution of the branch instruction, the execution of the branch instruction comprising a branch decision; and     means for comparing the output of each prediction means from the plurality of prediction means to the branch decision, the comparator means identifying a prediction means from the plurality of prediction means which most accurately predicts the branch decision for the branch instruction.

49. The apparatus of claim 48 further comprising means for removing the profiling instructions from the program, the means for removing profiling instructions further adding to the branch instruction an identification of the prediction means which most accurately predicts the branch decision for the branch instruction.

50. A system for predicting whether a branch specified by an instruction in a computer program will be taken during execution of the program by a computer, the instruction configured to cause selection from a distinct plurality of prediction means of a prediction means for predicting whether the branch specified by the instruction will be taken, the system comprising:

means for storing a current pattern comprising a number of consecutive identical branch decisions for the instruction, the means for storing further storing a prior pattern comprising a number of consecutive identical prior branch decisions for the instruction, the prior branch decisions occurring prior to the branch decisions comprised by the current pattern;

a circuit including a plurality of prediction means comprising the selected prediction means, the circuit configured to use the plurality of prediction means that use the current pattern and the prior pattern for generating a prediction of whether the branch will be taken; and     means for executing the instruction, the execution means for outputting a branch decision indicating whether the branch specified by the instruction was taken.

51. The system of claim 50 in which the means for storing further stores a pattern count, the pattern count comprising a count of occurrences of the prior pattern, the selected prediction means using the pattern count to generate a prediction of whether the branch will be taken.

52. The system of claim 50 further comprising update means for updating the pattern count according to the branch decision.

53. The system of claim 50 wherein the means for storing further storing a global sequence, the global sequence comprising a number of branch decisions for a plurality of instructions, the means for storing further storing a global count, the global count comprising a count of occurrences of the global sequence, the apparatus further comprising circuit means including global prediction means using the global sequence and the global count for generating a prediction of whether the branch will be taken.

54. The system of claim 53 further comprising update means for updating the global sequence, the global count, the current pattern, and the prior pattern according to the branch decision.

\* \* \* \* \*

UNITED STATES PATENT AND TRADEMARK OFFICE
CERTIFICATE OF CORRECTION

| | | |
|---|---|---|
| PATENT NO. | : | 5,687,360 |
| DATED | : | November 11, 1997 |
| INVENTOR(S) | : | Po-Hua Chang |

It is certified that error appears in the above-identified patent and that said Letters Patent is hereby corrected as shown below:

In column 17 at line 19 delete "outputing" and insert --outputting--

Signed and Sealed this

Thirty-first Day of March, 1998

Attest:

BRUCE LEHMAN

Attesting Officer

Commissioner of Patents and Trademarks